3,685,962
REGENERATION OF METAL HALIDE CATALYST
Thomas E. Kiovsky, El Sobrante, and Wilfried J. Petzny, Berkeley, Calif., assignors to Shell Oil Company, New York, N.Y.
Filed Apr. 27, 1970, Ser. No. 31,987
Int. Cl. C01g 9/04; C01c 1/16
U.S. Cl. 423—107                 2 Claims

ABSTRACT OF THE DISCLOSURE

A process is disclosed for recovering metal halide from a metal halide-ammonium halide complex by heating the complex in a thermal decomposition zone and passing the resulting vapor phase serially through at least two condensing zones, the first condensing zone being maintained at a temperature at which the higher boiling of the metal halide and the ammonium halide decomposition products condenses and the lower boiling of the two is in vapor phase, and the second condensing zone being maintained at a temperature where the lower boiling decomposition product condenses.

BACKGROUND

Figure 1:
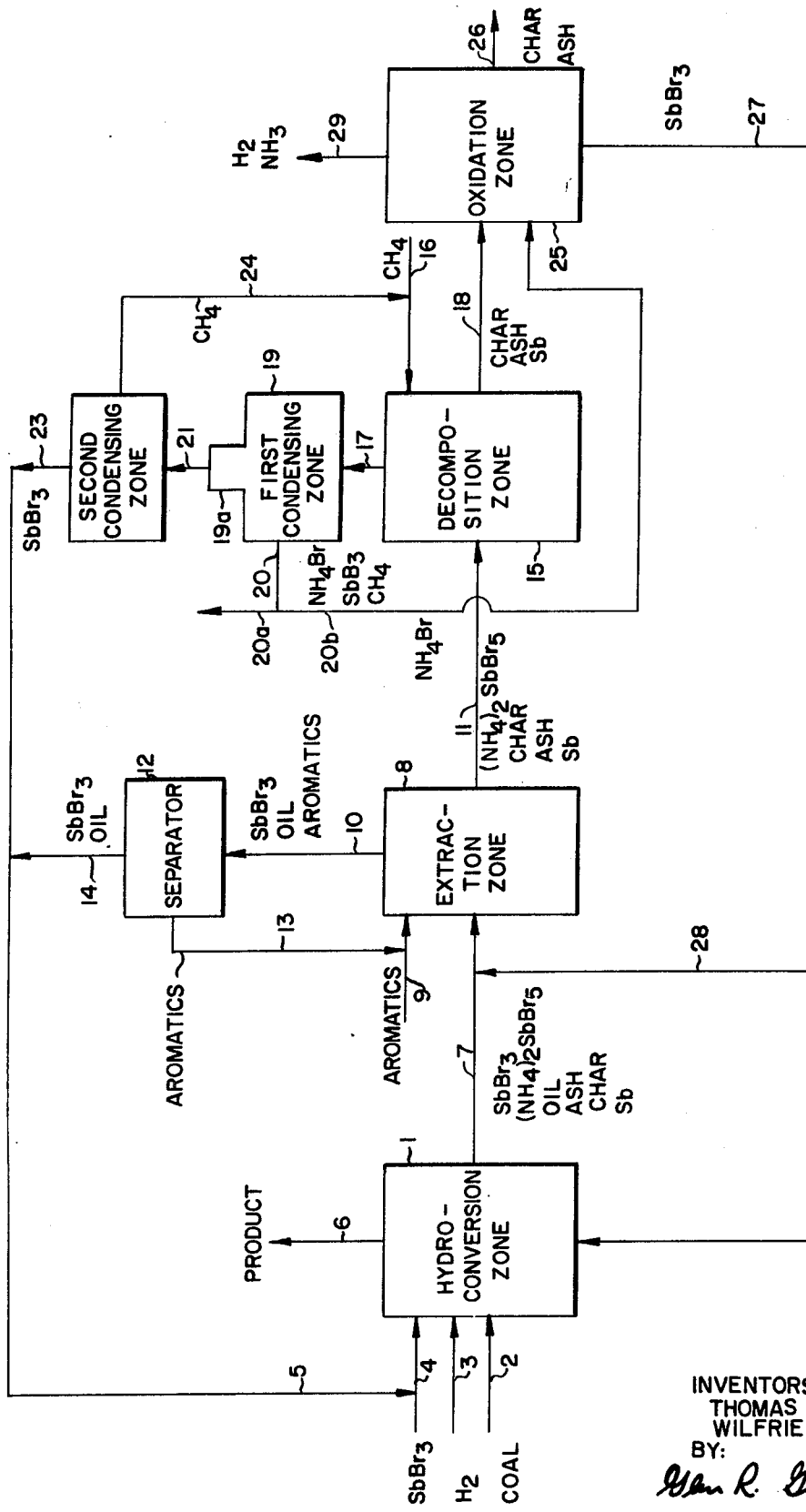

It has been found that certain metal halides when employed as a continuous phase at temperatures in the range of 350° C. and under hydrogen pressure are excellent catalysts for converting heavy hydrocarbons and similar materials, such as coal, into useful, low boiling hydrocarbons such as gasoline. Typical of these metal halides are antimony bromide, antimony iodide, zinc chloride, zinc bromide, zinc iodide, mercuric iodide, cadmium iodide, bismuth tribromide, bismuth triiodide, tin chloride, tin bromide, tin iodide, gallium bromide and arsenic iodide.

Most of the above-mentioned metal halides are excellent catalysts that resist deactivation by such materials as sulfur and oxygen that are organically bound in many materials that may be converted by such a process, and their reaction products, and additionally the metal halide catalysts are not deactivated by ash that is found in coal, coke that results from high temperature reactions of the charge, metals such as nickel and vanadium that are found in residual petroleum fractions and other such materials. However, the catalysts mentioned above are deactivated by the ammonia formed by hydrogenation of organically bound nitrogen found in many feeds to such a process, usually in coal. Deactivation by ammonia has been found to be partly due to the formation of a stable ammonium halide-metal halide complex having the general formula $(NH_4)_aMX_b$ where X is a halogen, M is a metal, and $a$ and $b$ are whole numbers.

Although the complex is not literally a catalyst poison, its presence causes loss of catalyst activity by dilution and by removing the metal halide from the bulk material as an active catalytic agent. A continuous phase metal halide catalyst can function with a large quantity of the complex in it, but as the complex builds up to significant quantities the catalyst activity drops off.

Regeneration of the metal halide catalyst by recovering the metal halide from the complex is important if a continuous process is to be economically effected. Prior attempts to restore the metal halide involved oxidation of the ammonium portion of the complex to water and nitrogen whereby the metal halide was released from the complex. However, this is a high-temperature process that is difficult to effect and it is accompanied by undesirable side reactions.

The process of this invention includes heating the complex in a decomposition zone, preferably with a sweep gas passing through the decomposition zone, to produce a vapor phase and subjecting the vapor phase to at least two condensing zones. The vapor phase contains at least one and usually both decomposition products of the complex, metal halide and ammonium halide. The first condensing zone is maintained at a temperature at which the higher boiling material as between the metal halide and the ammonium halide will condense while the lower boiling of the two will remain in the vapor phase. The second condensing zone is maintained at a temperature to condense the lower boiling of the two. Other gases may be condensed in the first, the second, in subsequent, or even in intermediate condensing zones or they may be discharged to the atmosphere depending upon the quantity of such gases, their boiling point, their value and other such factors. Only one separate condensing zone may be used when the decomposition zone is operated at a temperature where one decomposition product as between ammonium halide and metal halide is in vapor phase and the other is not. Thus, the decomposition zone could be a first condensing zone if maintained at the appropriate temperature and pressure in that a decomposition product condenses therein. However, the complex is usually mixed with ash, char, metals or other solids impurities, and it is accordingly preferred to operate the decomposition zone at a temperature at which both the metal halide and the ammonium halide are in vapor phase, and to use two condensing zones in addition to the decomposition zone.

A typical process exemplifying the invention is the conversion of coal to gasoline and other useful hydrocarbons employing as a catalyst a continuous phase of antimony tribromide. Under the influence of antimony tribromide, hydrogen pressures in the range of 2000 p.s.i., and temperatures in the range of 350° C., coal is converted to high yields of gasoline in a single-stage process. In addition to producing high yields of gasoline, undesirable materials in the coal are removed. Thus, organically bound oxygen is converted to water and organically bound sulfur is converted to hydrogen sulfide, both of which pass from the reaction zone and are separated from the desirable hydrocarbon products. The catalyst may be treated to remove ash or metal contaminants which apparently have no effect on the catalytic activity. However, the ammonia produced in removing organically bound nitrogen reacts with the catalyst to form the stable complex $(NH_4)_2SbBr_5$ and this complex builds up in quantity and dilutes the catalyst as the reaction proceeds.

To regenerate the antimony tribromide catalyst the complex is isolated from the catalyst, for example, by phase separation or by solvent extraction of a slipstream of the liquid catalyst phase and when isolated antimony tribromide is recovered from the complex as follows. The complex is placed in a decomposition zone and heated to a temperature between 300–400° C., preferably with an inert sweep gas such as nitrogen passing through it. There results a vapor phase passing from the decomposition zone which contains antimony tribromide, ammonium bromide, and possibly other materials such as hydrogen bromide, and ammonia, as well as the nitrogen sweep gas that promotes rapid flow of these materials from the decomposition zone. The flowing gas from the decomposition zone is passed serially through two condensing zones. The first condensing zone is maintained betwee 270° C. and 300° C. and in it the ammonium bromide solidifies from the gas. It is critical that the temperature in the first condensing zone be one at which ammonium bromide will solidify and antimony tribromide may exist as a vapor, and the condensing zone may be adapted to remove ammonium bromide as it accumulates if a continuous regeneration process is desired. It may also be desirable to include a fractionation zone after the first condensation zone, for example, a packed column, in order to increase the purity of the antimony tribromide recovered in a subsequent condensation zone.

Gas passing from the first condensation zone enters a second condensation zone which is at a temperature lower than 250° C. to cause antimony tribromide to condense from the vapor phase, and the second condensation zone may be adapted for removal of antimony tribromide. The remaining gas passing from the second condensation zone may be treated as economics dictate.

Although it is not known with certainty, apparently the temperature in the first condensing zone is one at which the reaction to form the complex can proceed only to a small extent or one at which the reaction rates are such that there is insufficient time for the complex to form again. At any rate, it was found that employing the process of this invention is substantially complete recovery of antimony bromide from the antimony bromide--ammonium bromide complex is achieved by the relatively low-temperature decomposition of the complex followed by serial, or fractional condensation of the vapor phase passing from the decomposition zone.

The foregoing example and those that follow illustrate species of this invention and are not intended as limitations on its scope. It is evident that the specific temperatures employed in the decomposition zone, the first condensing zone and the second condensing zone will be different for different metal halides, ammonium halides, and complexes. These temperatures may be readily determined from the literature or by experimentation in that the criteria for establishing them are known. Thus, the decomposition zone must function at a temperature at which the complex decomposes and at least one decomposition product, and preferably two are in the vapor phase. The first condensing zone must be at a temperature at which one decomposition product is in the vapor phase and the other is not. The second condensing zone must be at a temperature at which the remaining decomposition product is not in the vapor phase. The term decomposition product employed herein means a major decomposition product, specifically ammonium halide and metal halide, and it does not include additional decomposition products such as ammonia or hydrogen halide that might results from further decomposition of ammonium halide.

The sweep gas employed herein is preferably an inert, normally gaseous material that performs the function of carrying decomposition products from the decomposition zone without participating in the chemical reactions. Gases such as nitrogen, methane, carbon dioxide, hydrogen and others may be used.

Further examples of the process of this invention are presented in the following table.

|  | 1 | 2 |
| --- | --- | --- |
| Complex | $(NH_2)_2SbBr_5$ | $(NH_4)_2ZnCl_4$ |
| Decomposition zone temp. (° C.) | 320 | 320–330 |
| 1st condensing zone temp. (° C.) | 270–300 | 320–330 |
| 1st condensing zone product | $NH_4Br$ | $ZnCl_2$ |
| 2d condensing zone temp. (° C.) | 250 | 150 |
| 2d condensing zone product | $SbBr_2$ | $NH_4Cl$ |

The present invention may be best described with reference to the accompanying drawing which is a highly schematic flow diagam of a process embodying this invention. In the drawing the process is illustrated by boxes representing functions and lines indicating the flow of material. Conventional vessels, valves and other items of processing equipment have been omitted and no attempt is made in the drawing to illustrate the conventional equipment for effecting the various functions defined.

Referring to the drawing a hydroconversion zone 1 is provided to effect hydroconversion of coal into liquid hydrocarbon products. The zone 1 is charged with coal through line 2, with hydrogen through line 3, and with a catalyst consisting of molten antimony tribromide through line 4. It is contemplated that a body of antimony tribromide will be maintained within reaction zone 1 and that a slip stream of catalyst will be removed for regeneration in accordance with this invention and returned through line 5, and that fresh catalyst addition will be only that required to make up irretrievable losses of antimony tribromide. The product from the hydroconversion process is a low boiling hydrocarbon material which is withdrawn through line 6 for conventional downstream processing.

As the process proceeds various undesirable materials build up in the antimony bromide catalyst maintained in reaction zone 1. These materials include the ammonium halide-metal halide complex, ash from the coal, char which is unconvertable carbonaceous material, and possibly antimony metal resulting from reduction of antimony tribromide. In order to purify the catalyst a stream of catalyst is withdrawn from reaction zone 1 through line 7 and introduced into extraction zone 8. This stream will contain antimony tribromide catalyst and oil, both of which are desirable ingredients of the reaction zone 1 but which must inevitably be withdrawn with the undesirable ingredients because a complete separation in the reaction zone is not possible. Thus, the stream passing through line 7 into separator 8 contains antimony tribromide, oil, ammonium bromide-antimony bromide complex, ash, char, and possibly antimony metal.

Material from line 7 is contacted in separator 8 with a liquid aromatic material introduced through line 9 which selectively dissolves antimony tribromide and oil to separate them from the complex, ash, char, and antimony metal in the stream. Line 10 carries the mixture of antimony tribromide, oil and aromatics from separator 8 while line 11 carries away the undissolved material. Material from line 10 enters another separator 12, characteristically a fractionation column, wherein aromatics are separated from the oil and antimony tribromide, the aromatics being passed via line 13 into the aforementioned line 9 for return to separator 8 while the antimony tribromide and oil are carried though line 14 into the aforementioned line 5 and returned to the reaction zone 1.

Material in line 11 is transferred to thermal decomposion zone 15 wherein it is heated to about 350° C. to decompose the ammonium bromide-antimony bromide complex. A suitable sweep gas illustrated here as methane is introduced through line 16 so that vapor products from the thermal decomposition are quickly removed from the thermal decomposition zone 15 and swept through line 17. In line 17 a vapor phase which includes the methane sweep gas, antimony tribromide, ammonium bromide, and possibly ammonia and hydrogen bromide, the latter two materials resulting from the decomposition of ammonium bromide, is carried into first condensing zone 19. The ash, char and antimony metal from thermal decomposition zone 15 are removed through line 18.

The first condensing zone 19 is maintained at a temperature of approximately 280° C. at which temperature ammonium bromide condenses and it may be removed from first condensation zone 19 through line 20 from which it is either recovered as a product through line 20a or passed to zone 25 for oxidizing antimony metal through line 20b. Vapor phase removed from first condensation zone 19 passes through a fractionation zone 19a to insure that ammonium bromide does not escape and through line 21 into second condensation zone 22 in which antimony tribromide changes phase and is passed through line 23 into the aforementioned line 5 for return to reactor 1. The remaining methane passes through line 24 from which it is return to decomposition zone 15 via line 16.

The char, ash and antimony metal discharging from thermal decomposition zone 15 pass through line 18 into oxidizing zone 25. In oxidizing zone 25 the antimony metal is contacted with ammonium bromide under conditions to oxidize it to antimony tribromide or to complex salt which may be returned to decomposition zone 15. The remaining char and ash are removed through line 26 to be disposed of while the antimony tribromide resulting from the oxidation of antimony metal passes through line 27 returning to reactor 1, or if desired into line 28 wherein it is introduced into separator 8 which ultimately separates the antimony tribromide from other materials and returns it to reactor 1 via line 5. Hydrogen and ammonia pass from oxidizing zone 25 via line 29.

When hydrogen bromide is introduced into reaction zone 1, the oxidation of antimony metal takes place in situ and from the overall processing viewpoint the formation of antimony metal never occurs. When such is the case, oxidation zone 25 may be unnecessary and line 18 will carry only char and ash which may be disposed of. With such an operation, ammonium bromide may be reacted, for example, with sulfuric acid, to produce hydrogen bromide which is returned to the hydroconversion zone. In such a process oxidation zone 25 may be dispensed with.

Many of the elements illustrated in the drawing may be modified or removed completely within the scope of this invention. The extraction zone 8 may function with any solvent for metal halide and oil or it may be eliminated. Since the liquid in line 7 contains useful antimony bromide catalyst and oil, it is preferred that a simple extraction of this material and return of it to the reaction zone 1 be effected to reduce the load on decomposition zone 15.

We claim as our invention:

1. A process for regenerating zinc-halide catalyst selected from zinc chloride, zinc bromide and zinc iodide from a spent catalyst mixture containing a complex of the zinc halide and an ammonium halide compound of the same halogen which comprises:
    (a) heating the spent catalyst mixture in a decomposition zone to a temperature at which the complex decomposes into vapor phase materials including zinc halide and ammonium halide,
    (b) passing a non-reactive sweep gas into said decomposition zone,
    (c) passing the sweep gas and vapor phase material from the decomposition to a first condensing zone,
    (d) condensing the higher boiling of the zinc halide and ammonium halide in the first condensing zone and passing sweep gas and uncondensed vapor to a second condensing zone,
    (e) condensing the lower boiling of the zinc halide and ammonium halide in the second condensing zone,
    (f) and separately recovering zinc halide, ammonium halide, and a residue from the decomposition zone.

2. The process of claim 1 wherein the zinc halide-ammonium halide complex is a complex of zinc iodide and ammonium iodide.

References Cited

UNITED STATES PATENTS

| | | | |
|---|---|---|---|
| 3,282,642 | 11/1966 | Goodenough et al. | 23—100 X |
| 3,347,625 | 10/1967 | Kimberlin, Jr. et al. | 23—100 X |
| 2,288,405 | 6/1942 | Kepfer | 23—97 |
| 3,371,049 | 2/1968 | Gorin et al. | 208—10 X |

OTHER REFERENCES

Hackh's Dictionary, third ed. revised 1944, pp. 47, 48 and 922, McGraw-Hill Book Co., Inc., New York.

EDWARD STERN, Primary Examiner

U.S. Cl. X.R.

423—471, 88